US006940936B2

(12) United States Patent
Knutson

(10) Patent No.: US 6,940,936 B2
(45) Date of Patent: Sep. 6, 2005

(54) ALTERNATE TIMING SIGNAL FOR A VESTIGIAL SIDEBAND MODULATOR

(75) Inventor: Paul Gothard Knutson, Mercer County, NJ (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 395 days.

(21) Appl. No.: 09/994,392

(22) Filed: Nov. 26, 2001

(65) Prior Publication Data

US 2003/0099317 A1 May 29, 2003

(51) Int. Cl.[7] .................................................. H04L 7/00

(52) U.S. Cl. ....................... 375/355; 375/294; 375/327; 348/608; 348/725

(58) Field of Search ................................ 375/294, 327, 375/344, 355, 240.01, 240.25, 261, 326; 348/608, 725

(56) References Cited

U.S. PATENT DOCUMENTS

| | | | | |
|---|---|---|---|---|
| 3,701,023 A | * | 10/1972 | Fang | 375/326 |
| 4,748,667 A | * | 5/1988 | Farmer et al. | 380/208 |
| 5,353,312 A | | 10/1994 | Cupo et al. | |
| 5,673,293 A | | 9/1997 | Scarpa et al. | |
| 5,706,057 A | * | 1/1998 | Strolle et al. | 375/240.01 |
| 5,799,037 A | | 8/1998 | Strolle et al. | |
| 5,802,461 A | | 9/1998 | Gatherer | |
| 5,805,242 A | | 9/1998 | Strolle et al. | |
| 5,818,544 A | | 10/1998 | Han | |

FOREIGN PATENT DOCUMENTS

WO WO 01/50757 A1 * 7/2001 .......... H04N/7/173

OTHER PUBLICATIONS

J. Bao, et al., entitled "A New Timing Recovery Method for DTV Receivers", 1998 IEEE, dated Jun. 25, 1998, pp. 1243–1249.

* cited by examiner

*Primary Examiner*—Shuwang Liu
(74) *Attorney, Agent, or Firm*—Joseph S. Tripoli; Joseph J. Laks; Ronald H. Kurdyla

(57) ABSTRACT

A remodulator timing signal (35) is generated by a phase locked loop (33) which is coupled to a broadcast vestigial sideband signal (5). Within the signal (5) is highly accurate timing data which is coupled to a demodulator (31). Timing signals to the demodulator are provided by a variable frequency oscillator (32) which receives a correction signal from a phase locked loop (33) housed within the demodulator. The phase locked loop generates the correction signal by comparing the VFO output frequency (36) with the timing data embedded within the broadcast signal (5). A value register (203,303,403) maintains the recent average VFO frequency. A multiplexer (204,304,404) selects the value register data to control the VFO (32,220,320) in the absence of the broadcast timing data.

9 Claims, 3 Drawing Sheets

System

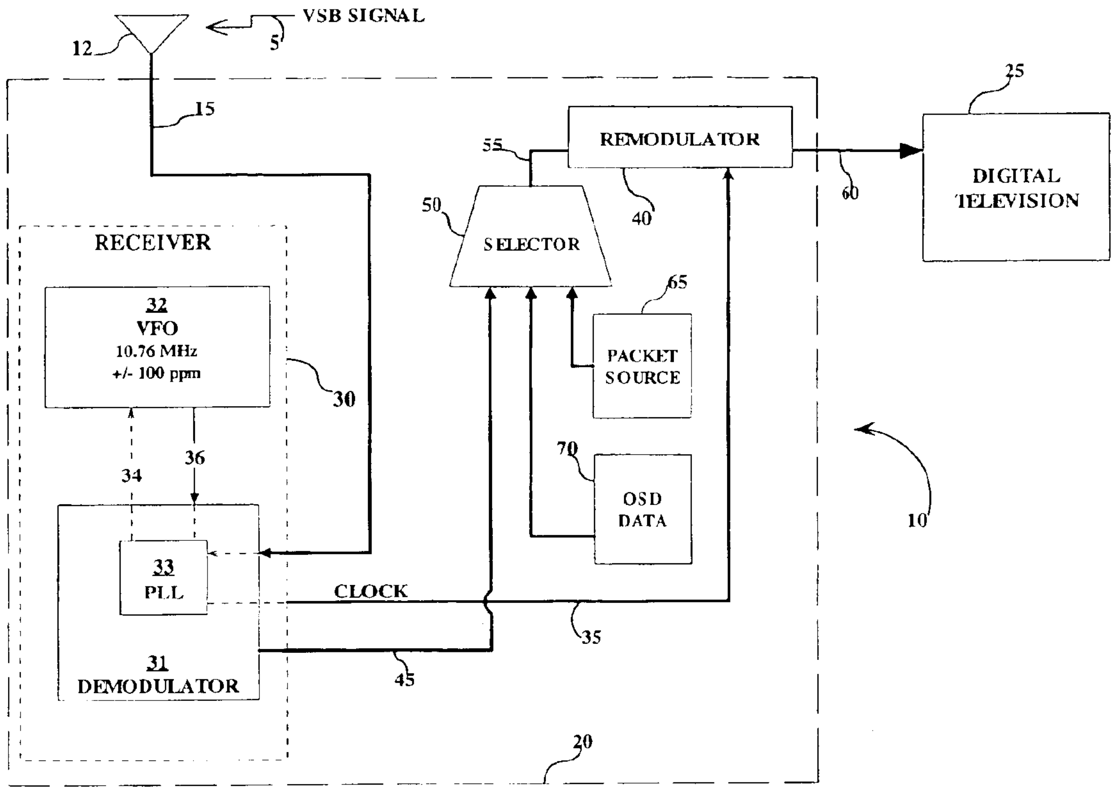
Fig. 1 - System

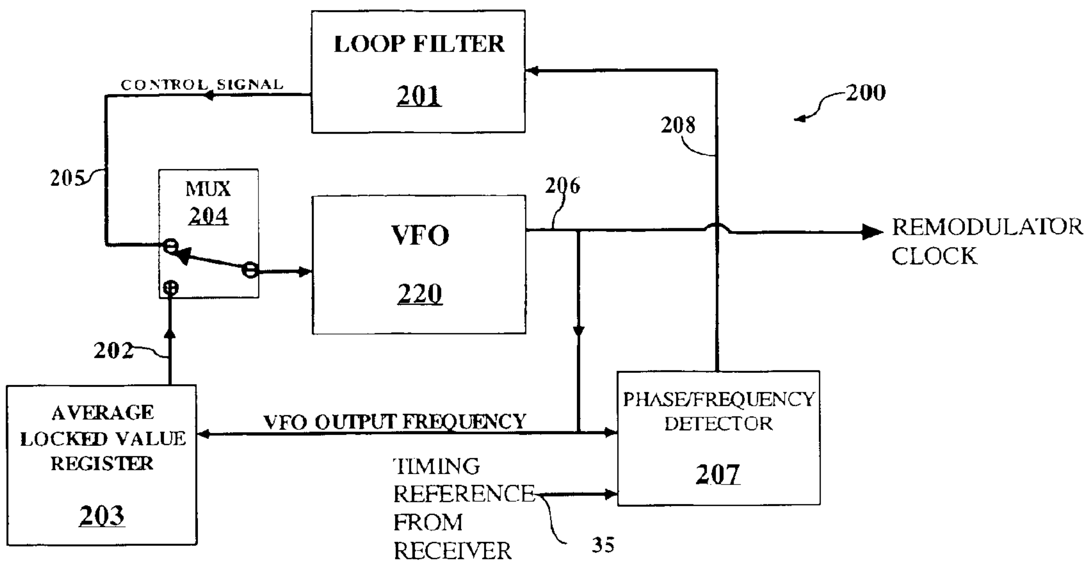
Fig. 2 - Independent
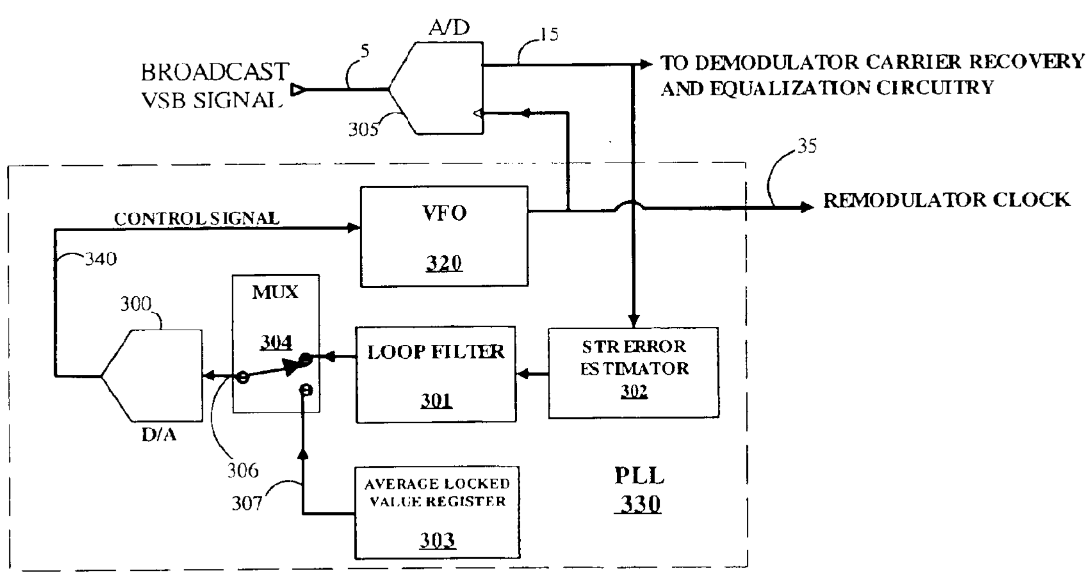
Fig. 3 – Preferred analog

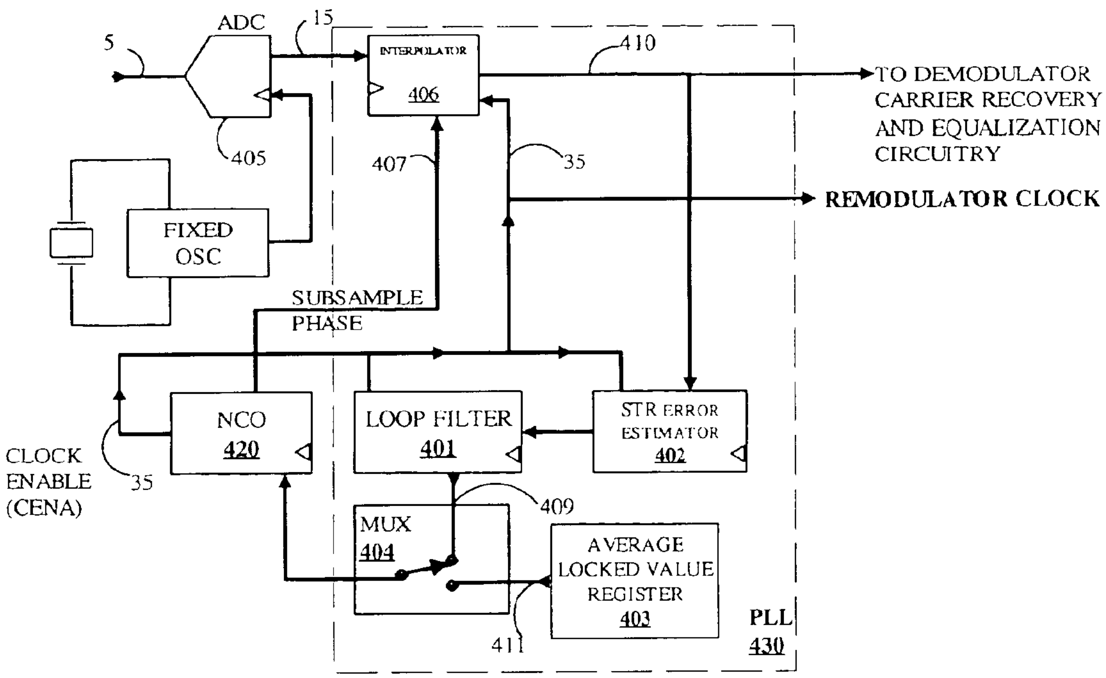
Fig. 4 – Preferred digital

ALTERNATE TIMING SIGNAL FOR A VESTIGIAL SIDEBAND MODULATOR

FIELD OF THE INVENTION

The present invention relates to the timing and synchronization function of a remodulator system.

BACKGROUND OF THE INVENTION

High definition television (HDTV) broadcast standards are defined by the Advanced Television Systems Committee (ATSC) of the "Digital HDTV Alliance" formed by U.S. television vendors. The ATSC A/53 Digital Television Standard states that equipment used for transmitting HDTV signals requires a timing accuracy of 10 ppm. Consumer electronic devices such as Digital Video Disc (DVD) players which will be used in conjunction with a digital television receiver therefore require a clock or timebase signal of similar accuracy, the clock signal typically being supplied by an internal stand alone reference oscillator. The cost and complexity of such an oscillator is a significant contributor to the total cost of the completed device.

Multivalue symbol vestigial sideband (VSB) modulation in accordance with the ATSC standard is a known modulation method for digitally transmitting information data such as HDTV signals. The recovery of data from the transmitted VSB signal containing digital video and related information at a digital receiver inherently requires the implementation of three functions: timing recovery for symbol synchronization, carrier recovery (frequency demodulation) and equalization. Timing recovery is the process by which the receiver clock (timebase) is synchronized to the transmitter clock by decoding the timing signal which is embedded in the transmitted VSB signal.

An example of a device to perform this function is disclosed in U.S. Pat. No. 5,943,369, entitled TIMING RECOVERY SYSTEM FOR A DIGITAL SIGNAL PROCESSOR, issued Aug. 24, 1999 to Knutson et al. A device for receiving quadrature amplitude modulated signals representing successive symbols is disclosed in U.S. Pat. No. 5,878,088, entitled DIGITAL VARIABLE SYMBOL TIMING RECOVERY SYSTEM FOR QAM, issued Mar. 2, 1999, issued to Knutson et al. The accuracy of the recovered timing signal is substantially equivalent to the accuracy of the transmitted VSB timing signal.

BRIEF SUMMARY OF THE INVENTION

In accordance with the principles of the present invention, an accurate timing reference is derived from a broadcast VSB channel. In a consumer electronics context, for example, the reception and demodulation of the broadcast signal is performed by receiver circuitry within a digital image producing device such as a DVD player or Video Cassette Recorder (VCR). The VCR is tuned to a broadcast television channel containing the embedded symbol timing information and the symbol timing sequence or tone is decoded. The resulting timing information is sent to the VCR remodulator which uses the timing signal as the source for clock pulses or clock synchronization, thereby eliminating the need for a separate high accuracy reference oscillator within the VCR remodulator. During playback of a tape within the VCR, the VCR receiver is operating to provide the remodulator clock pulses needed to send digitized video information from the VCR to a suitable video display device, such as a digital television receiver.

In normal operation, the VCR receiver will operate continuously during the entire playback period to provide the necessary clock pulses to the remodulator in real time. In the absence of a broadcast signal, the VCR receiver may operate only to detect the broadcast timing signal during an initial acquisition or "pull-in" period.

Once the timing signal has been acquired, the control signal to the variable oscillator of the phase locked loop (PLL) could be frozen to approximate the required clock accuracy without the need for continuous reception of the broadcast VSB signal.

BRIEF DESCRIPTION OF THE DRAWING

FIG. 1 is a block diagram of a system for producing an alternate timing signal constructed in accordance with the principles of the present invention;

FIG. 2 is a block diagram of an independent phase locked loop circuit utilized by the remodulator of the system depicted in FIG. 1;

FIG. 3 is a block diagram of a preferred analog signal timing recovery circuit utilized in the system depicted in FIG. 1; and FIG. 4 is a block diagram of a preferred digital signal timing recovery circuit that may be used instead of the circuit depicted in FIG. 3.

DETAILED DESCRIPTION OF THE INVENTION

FIG. 1 is a block diagram of a reference signal producing device 10 which can provide a timing signal, thereby eliminating the need for a highly stable reference oscillator that would create a similar signal. The device 10 includes an RF signal input path 15 which is suitable for receiving a broadcast VSB signal 5 via antenna 12. The device 10 is configurable, and in the particular embodiment depicted here the device 10 is housed as a subsystem of a consumer electronics device 20 such as a VCR, satellite broadcast receiver, computer, DVD player or on screen display (OSD) unit which typically sits atop or adjacent to a digital television receiver 25.

The broadcast VSB signal 5 is coupled to a VSB receiver 30 which includes a variable frequency oscillator (VFO) 32 and a demodulator 31. Specifically, the VSB signal 5 contains a 10.76 MHz (or its second harmonic 21.52 MHz) clock signal 15 which, according to the relevant ATSC specification is accurate to within ten parts per million (for the 10.76 MHz signal). VFO 32 has a center frequency of 10.76 MHz but is accurate only to within one-hundred ppm.

The VFO 32 may be an analog device utilizing a crystal controlled oscillator, it may be a voltage controlled oscillator receiving the correction signal 34 as a series of purely digital increments, or it may be a numerically controlled oscillator which controls clock enable signals and interpolators (discrete time sample rate converters) at the desired rate. An independent PLL could also be used which locks to the clock signal recovered from an independent receiver symbol timing recovery loop.

The demodulator 31 includes a phase locked loop (PLL) 33 which receives a reference clock signal 15 from the VSB signal 5, and generates an output clock signal CLOCK 35 having a desired frequency. The PLL 33 is coupled to and capable of adjusting the frequency of VFO 32 by generating a correction signal 34. The output signal 36 of VFO 32 is coupled to the PLL 33 and compared to the VSB signal 15 to verify the accuracy of VFO 32. When driven by an ATSC VSB signal, the PLL 33 generates a CLOCK 35 signal having an accuracy of within 10 ppm, otherwise the accuracy of the CLOCK 35 signal is within the 100 ppm accuracy of the VFO 32.

FIG. 3 illustrates the signal timing recovery (STR) PLL 330 of a typical analog oscillator based VSB demodulator. In this embodiment, PLL 330 serves as a substitute for the PLL 33 of FIG. 1 and analog VFO 320 is a substitute for the VFO 32 depicted in FIG. 1. The timing reference component in the VSB broadcast signal 5 is digitized by an ADC 305. The digitized timing reference component is coupled to an STE timing error estimator 302. The STR timing error estimator 302 computes digital signal representing the error between the clock signal generated by the VFO 320 and the received timing reference signal 15. Loop filter 301 filters the error and generates a control signal 340 for the VFO 320. Because the VFO 320 is an analog VFO, a digital-to-analog converter (DAC) 300 is used to convert the numeric control signal 306 into a voltage control signal 340. Because the remodulator timing signal 35 is intended to have a substantially constant frequency, the STR loop is used to lock the phase of and additionally to track and eliminate drift in the remodulator clock signal 35 from the VFO 320.

In this embodiment, the effect of an outage of the received VSB signal 5 is minimized by introducing a VFO 320 control value 340 equal to the average recent locked value of the loop filter 301 output 306. Multiplexer 304 is switched automatically to the value stored in register 303 when the VSB signal 5 is absent or of poor quality. The register 303, in turn, receives control values from the loop filter 310 and maintains a running average of those values for a predetermined time interval. The insertion of the average value 307 obtained from register 303 will minimize the open loop output frequency change of VFO 320 for brief periods of VSB signal loss.

FIG. 4 illustrates a fully digital symbol timing recovery phased locked loop 430. In FIG. 4, the received timing reference signal 15 is digitized by an ADC 405 and the digitized timing reference component 410 is coupled to an STR phase error estimator 402 via an interpolator 406. The STR phase error estimator 402 generates a digital signal representing the phase error between the clock enabled samples 410 produced by the interpolator 406 and the remodulator clock signal 35 produced by the numerically-controlled-oscillator (NCO) 420. Loop filter 401 filters the error and generates a control signal 409 for numerically controlled oscillator (NCO) 420. The NCO 420 generates a clock enable pulse 35 at the desired sample rate as well as a phase adjustment signal 407 used to interpolate the analog to digital samples to the desired sample rate. As in the analog case, multiplexer 404 can be used to supply the recent average locked value 411 of register 403 to NCO 420, thereby keeping NCO 420 close to the desired frequency in absence of a broadcast VSB signal 5.

FIG. 2 illustrates the use of a phase locked loop 200 for providing a clock signal to the remodulator 40 which operates independently of the phase locked loop 33 within the demodulator 31 (of FIG. 1). Referring back to FIG. 1, the demodulator 31 has an integrated symbol timing recovery loop, including a phase locked loop 33, which generates a timing signal 35. The PLL 200 illustrated in FIG. 2 locks to the receiver timing reference signal 35 from the demodulator 31 to generate timing pulses 206 for the remodulator 40. The phase/frequency detector 207 compares signal 35 with VFO output timing pulses 206 to generate a phase error signal 208. The phase error signal 208 is passed through loop filter 201 to generate a correction signal 205 to control the frequency of the VFO 220. Register 203 maintains a recent average value of the control signal 205, as described above. Multiplexer 204 selects correction signal 205 as long as timing reference signal 35 is present. Whenever timing reference signal 35 is interrupted, multiplexer 204 selects the average frequency value 202 from register 203 as the control signal for VFO 220. This approach separates the demodulator 31 and remodulator 40 phase locked loop subsystems.

Referring again to FIG. 1, a remodulator 40 generates a VSB signal 60 representing digital television signal data. This VSB signal 60 is supplied to a television signal receiving device 25, which in the illustrated embodiment is a digital television receiver. The particular type of receiving device is not germane to the present invention and may be any such device. A selector 50 selects one source of a television signal. A first input terminal of the selector 50 receives the demodulated television signal 45 from the demodulator 31; a second input terminal of the selector is coupled to a source of data packets from an external source (not shown) representing a digital television signal; and a third input terminal of the selector 50 is coupled to an on-screen display (OSD) 70.

The primary purpose of PLL 33 is to provide an accurate time reference for the operation of the system illustrated in FIG. 1, including in particular the receiving device 25. While some VSB signal receivers may in fact be capable of adequate demodulation with an input signal having a clock accuracy of +/−100 ppm, the ATSC specification requires that VSB digital television signals be generated with a timing accuracy of +/−10 ppm. The VFO 32, however, has an accuracy of around only +/−100 ppm when operating in an open loop condition, that is when the VSB signal 15 is not being received by PLL 33. In that case the correction signal 34 which is normally coupled to VFO 32 would not be generated, and the enhanced +/−10 ppm accuracy due to the presence of the clock component in the VSB signal 15 would not be available. Instead the VFO 32 would depend entirely on its own inherent +/−100 ppm accuracy. In a closed loop configuration, that is when the VSB signal 15 is being received, the PLL 33 generates the correction signal 34. In the closed loop case, the VFO 32 has an accuracy substantially equal to the accuracy of the timing information contained within signal 15. By including the average locked value register (203,303,403), the open loop error of +/−100 ppm may be reduced, and may even approach or achieve the desired +/−10 ppm accuracy. However, even in this configuration, the VFO (32,220,320) frequency will still drift due to voltage, thermal and component variation. In either case the remodulator 40 always receives its primary timing information used for its remodulation functions from the output signal 35 of the PLL 33 (of FIG. 1); PLL 200 (of FIG. 2); PLL 330 (of FIG. 3); or PLL 430 (of FIG. 4).

The receiver 30 not only generates the timing signal 35 from the broadcast VSB signal 5, but the demodulator 31 also recovers whatever digital video, audio and data stream 45 was contained within the broadcast signal 5. The recovered data stream 45 is coupled to an input of source selector 50. The selected output signal 55 of source selector 50 may be coupled to the input terminal of VSB remodulator 40. The remodulator 40 serves to reconstruct the data stream 45 as appropriate to 8 value and 16 value VSB modulation signals 60, the signals 60 being coupled to the input of the digital television 25 for video and audio play.

Other inputs to the source selector 50 can include a VSB packet source 65 such as videotape player, computer, satellite receiver, data cable, stereo decoder or DVD player. An additional input could be OSD source 70 for the display of menu and status information on the television 25.

What is claimed is:

1. A remodulator clock signal source, comprising:

a vestigial sideband demodulator, the demodulator being responsive to vestigial sideband transmissions containing timing information, the demodulator recovering the timing information; and a signal path coupling the recovered timing information produced by the demodulator to a remodulator clock input so as to regulate the remodulator timing sequence, the remodulator clock signal source further comprising a phase locked loop including a variable frequency oscillator coupled to the demodulator for generating clock pulses in response to the timing information; wherein the phase locked loop further comprises an open loop operating condition characterized by an absence of data from the timing information wherein an oscillator correction signal substantially equal to the average value of correction signal over a recent time interval is generated, thereby causing the remodulator to operate without a correction signal from current timing information.

2. A system comprising:

an input for receiving a modulated signal comprising timing information;

a demodulator coupled to the input for extracting the timing information;

a phase locked loop including a variable frequency oscillator coupled to the demodulator for generating clock pulses in response to the timing information; and a remodulator coupled to the phase locked loop for receiving the generated clock pulses wherein said phase locked loop has an open loop operating condition characterized by an absence of data from the timing information and wherein an oscillator correction signal substantially equal to the average value of correction signal over a recent time interval is generated, thereby causing the remodulator to operate without a correction signal from current timing information.

3. The system of claim 2, further comprising, the variable frequency oscillator receiving a correction signal from the phase locked loop based upon the source of timing information, the variable frequency oscillator thereby having an accuracy substantially equal to the source of timing information when operating in a closed loop operating condition.

4. A system according to claim 2, wherein the modulated signal is a VSB modulated signal containing high definition television information.

5. A system according to claim 4, wherein the VSB modulated signal is in accordance with the ATSC standard.

6. A system comprising:

an input for receiving a modulated signal comprising timing information;

a demodulator coupled to the input for extracting the timing information;

a phase locked loop coupled to the demodulator for generating clock pulses in response to the timing information;

a variable frequency oscillator, coupled to the phase locked loop, the variable frequency oscillator receiving a correction signal from the phase locked loop based upon the source of timing information, the variable frequency oscillator thereby having an accuracy substantially equal to the source of timing information; and a remodulator coupled to the phase locked loop for receiving the generated clock pulses;

wherein the phase locked loop further comprises;

a first closed loop operating condition characterized by the generation of the correction signal to the variable frequency oscillator based upon data from the timing information; and a second open loop operating condition characterized by an absence of data from the timing information, thereby causing the variable frequency oscillator to operate without a correction signal.

7. The system of claim 6, further comprising:

a value register coupled to the variable frequency oscillator and maintaining a value substantially equal to the average value of the correction signal over a recent time interval; and a multiplexer, the multiplexer selectively coupling the value from the value register to the variable frequency oscillator in the open loop operating condition, and coupling the correction signal from the phase locked loop to the variable frequency oscillator otherwise.

8. A system according to claim 6 wherein the modulated signal is a VSB modulated signal containing high definition television information.

9. A system according to claim 8, wherein the VSB modulated signal is in accordance with the ATSC standard.

* * * * *